(12) United States Patent
Kozlowski

(10) Patent No.: US 6,556,715 B1
(45) Date of Patent: Apr. 29, 2003

(54) METHOD FOR CCITT COMPRESSION OF IMAGE DATA

(75) Inventor: William L. Kozlowski, Novi, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/430,313

(22) Filed: Oct. 29, 1999

(51) Int. Cl.$^7$ .................................................. G06K 9/36
(52) U.S. Cl. ...................................... 382/232; 382/239
(58) Field of Search ................................. 382/232, 298, 382/169, 171, 172, 237; 358/430, 431, 419, 451, 447, 448

(56) References Cited

U.S. PATENT DOCUMENTS 5,140,444 A * 8/1992 Klein et al. ................. 358/447
5,636,294 A * 6/1997 Grosse et al. ................ 382/239
5,999,663 A * 12/1999 Edwards et al. ............ 382/298

* cited by examiner

Primary Examiner—Andrew W. Johns
Assistant Examiner—Duy M. Dang
(74) Attorney, Agent, or Firm—Brooks & Kushman P.C.; Lise A. Rode; Mark T. Starr

(57) ABSTRACT

A method of compressing image data utilizing CCITT Group 4 coding criteria reduces compression time and the amount of required data transfer by combining pixel data thresholding and transposition steps through the capabilities of a customized processing chip. Additional economies are achieved by using black/white and white/black transition pointers rather than the conventional approach requiring examination of every pixel to locate the transitions in preparation for conventional CCITT Group 4 encoding.

10 Claims, 12 Drawing Sheets

RASTER FORMAT

SCANNER FORMAT

THRESHOLDING TO PRODUCE A COMPRESSED BYTE

| PIXEL # | EXAMPLE VALUE | BACKGROUND AVG | BACKGROUND THREASH | RESULT |
|---------|---------------|----------------|--------------------|--------|
| 7.0 | 52 | 65 | 58 | 0 |
| 6.0 | 48 | 65 | 58 | 0 |
| 5.0 | 72 | 65 | 58 | 1 |
| 4.0 | 75 | 65 | 58 | 1 |
| 3.0 | 10 | 54 | 48 | 0 |
| 2.0 | 5  | 54 | 48 | 0 |
| 1.0 | 11 | 54 | 48 | 0 |
| 0.0 | 72 | 54 | 48 | 1 |

RESULT OUTPUT BYTE = 00110001 = 31 IN HEXADECIMAL
THE RESULT OUTPUT IS STORED AS THE TRANSPOSED THRESHOLDED BYTE

BLACK AND WHITE LOOK UP TABLES

- EACH LOOKUP TABLE CONTAINS 256 LOCATIONS, 1 FOR EACH POSSIBLE INPUT PIXEL VALUE.

- THE TABLES ARE MEANT TO FIND THE FIRST OCCURRENCE OF A WHITE OR BLACK PIXEL. THIS CAN BE DONE BY CHANGING THE INPUT PIXEL VALUE AND WRITING THE VALUE IN BINARY.

- FOR EXAMPLE A PIXEL VALUE OF 3lh IS REPRESENTED AS:

```
                                                    800
                    BIT POSITION
              7   6   5   4   3   2   1   0
              0   0   1   1   0   0   0   1
              B   B   W   W   B   B   B   W
   3lh   →    L   L   H   H   L   L   L   H
              A   A   I   I   A   A   A   I
              C   C   T   T   C   C   C   T
              K   K   E   E   K   K   K   E
```

- FOR THE WHITE LOOKUP TABLE, THE VALUE OF 3lh WOULD YIELD AN OUTLET OF 3. THIS REPRESENTS THE FIRST TIME A VALUE OF 1 WAS FOUND AT A PIXEL POSITION, MOVING FROM LEFT TO RIGHT.

- FOR THE BLACK LOOKUP TABLE, THE VALUE OF 3lh WOULD YIELD AN OUTPUT OF 1. THIS REPRESENTS THE FIRST TIME A VALUE OF 0 WAS FOUND AT A PIXEL POSITION, MOVING FROM LEFT TO RIGHT

- AN OUTPUT VALUE OF 0 MEANS A BLACK OR WHITE PIXEL WAS NOT FOUND. FOR BLACK THE VALUE OF 255 WOULD YIELD 0 AND FOR WHITE A VALUE 0 WOULD YIELD 0.

*Figure 8*

WHITE PIXEL = 1
BLACK PIXEL = 0

IMAGINARY
WHITE PIXEL

PASS MODE CODING – B2 LEFT OF A1

```
B0         B1 B2
 1  1  1  0  1  0  0  0  0  0  0  0  0  0  0  1  1  1  0  0  0    901   910
 1  1  1  1  0  0  0  1  1  0  0  0  1  0  0  1  1  0  0  0  0
 A0         A1       A2                                            902
```

A1 CORRECTION = 0  →  A1 CORRECTION = B2 – A0 = 4
B1 CORRECTION = 0  →  B1 CORRECTION = 0

VERTICAL MODE CODING – NOT PASS MODE, DISTANCE FROM
(A1 TO B1) < 4

```
      B0 B1                                    B2                  920
 1  1  1  0  1  0  0  0  0  0  0  0  0  0  0  1  1  1  0  0  0
 1  1  1  1  0  0  0  1  1  0  0  0  1  0  0  1  1  0  0  0  0
       A0 A1       A2
```

A1 CORRECTION = 4  →  A1 CORRECTION = 0
B1 CORRECTION = 0  →  B1 CORRECTION = 0

HORIZONTAL MODE CODING – NOT PASS OR VERTICAL MODE

```
         B0                                   B1       B2          930
 1  1  1  0  1  0  0  0  0  0  0  0  0  0  0  1  1  1  0  0  0
 1  1  1  1  0  0  0  1  1  0  0  0  1  0  0  1  1  0  0  0  0
         A0       A1       A2
```

A1 CORRECTION = 0  →  A1 CORRECTION = 0
B1 CORRECTION = 0  →  B1 CORRECTION = A2 – A0 = 6

```
                                 B0            B1       B2         940
 1  1  1  0  1  0  0  0  0  0  0  0  0  0  0  1  1  1  0  0  0
 1  1  1  1  0  0  0  1  1  0  0  0  1  0  0  1  1  0  0  0  0
                                 A0         A1 A2
```

A1 CORRECTION = 0
B1 CORRECTION = 6

*Figure 9*

METHOD FOR CCITT COMPRESSION OF IMAGE DATA

BACKGROUND OF THE INVENTION

The invention generally relates to compression of digital image data. More particularly, the invention pertains to improved CCITT Group 4 image data compression.

The conventional steps required to compress an image in accordance with the CCITT Group 4 standard from a raw gray scale image include thresholding a gray scale image by creating an image consisting of only black and white pixel values, and taking the thresholded values and producing a series of code according to the CCITT Group 4 standard which will allow a decompression engine to exactly recreate the image of black and white pixel values.

The process of producing the series of codes relies on the ability to handle two lines of the image pixels at a time. These lines flow from left to right and then top to bottom of an image in an organization termed a raster format (see FIG. 1, in which the initial image pixel would be that portion or corner of the document or check at 110 and the last pixel element would then correspond to the bottom corner 120 of document 100). Because of the nature of some document scanning devices, such as that found in the Unisys Corporation SourceNDP Teller/Scanner Machine, the original image is stored as shown in FIG. 2—i.e. from bottom to top, right to left. In other words, the initial pixel in the format of FIG. 2 would correspond to corner 210 of document 200, while the last pixel would correspond to corner 220 of document 200. The process must then know how long each black and white pixel run (commonly called run lengths) is for both lines of the image being processed simultaneously. Depending upon the length and order of the runs of a same color, different CCITT Group 4 codes are produced.

One disadvantage of this known method requires the examination of each pixel in a line or row of the document image in order to determine where color transitions—i.e. the end of a run, is located. This approach requires numerous relatively slow memory accesses. Additionally, these prior approaches required a separate transposition step to order the image pixels in the proper raster format prior to compressing the image data, at least for those systems using scanners which produced a pixel order essentially reversed from that desired.

There is therefore seen to be a need in the compression art for a faster, less memory access-intensive procedure for implementing CCITT Group 4 image data compression.

SUMMARY OF THE INVENTION

Accordingly, a method for CCITT compression of image data comprises the steps of creating and saving a scaled background of the image by calculating a background average for each array of pixels of a predetermined size, thresholding each pixel to a black or white rendition and storing the thresholded pixels in a manner which automatically transposes the pixels to a predetermined order, determining run lengths of adjacent pixels having like color and storing the run lengths as color transition pointers in a memory table, and processing two rows of thresholded pixels simultaneously pursuant to CCITT Group 4 encodins principles using the color transition pointers from the memory table in place of retrieving and examining each pixel to determine transition locations in the two rows.

BRIEF DESCRIPTION OF THE DRAWINGS

The objects and features of the invention will become apparent from a reading of the detailed description of a preferred embodiment, taken in conjunction with the drawing, in which:

FIG. 8 sets forth an example of how look-up tables are used in accordance with the invention to determine color transition locations in the thresholded pixels of each row;

FIG. 9 sets forth an example of various encoding steps in accordance with CCITT Group 4 data compression;

DETAILED DESCRIPTION

Figure 3:
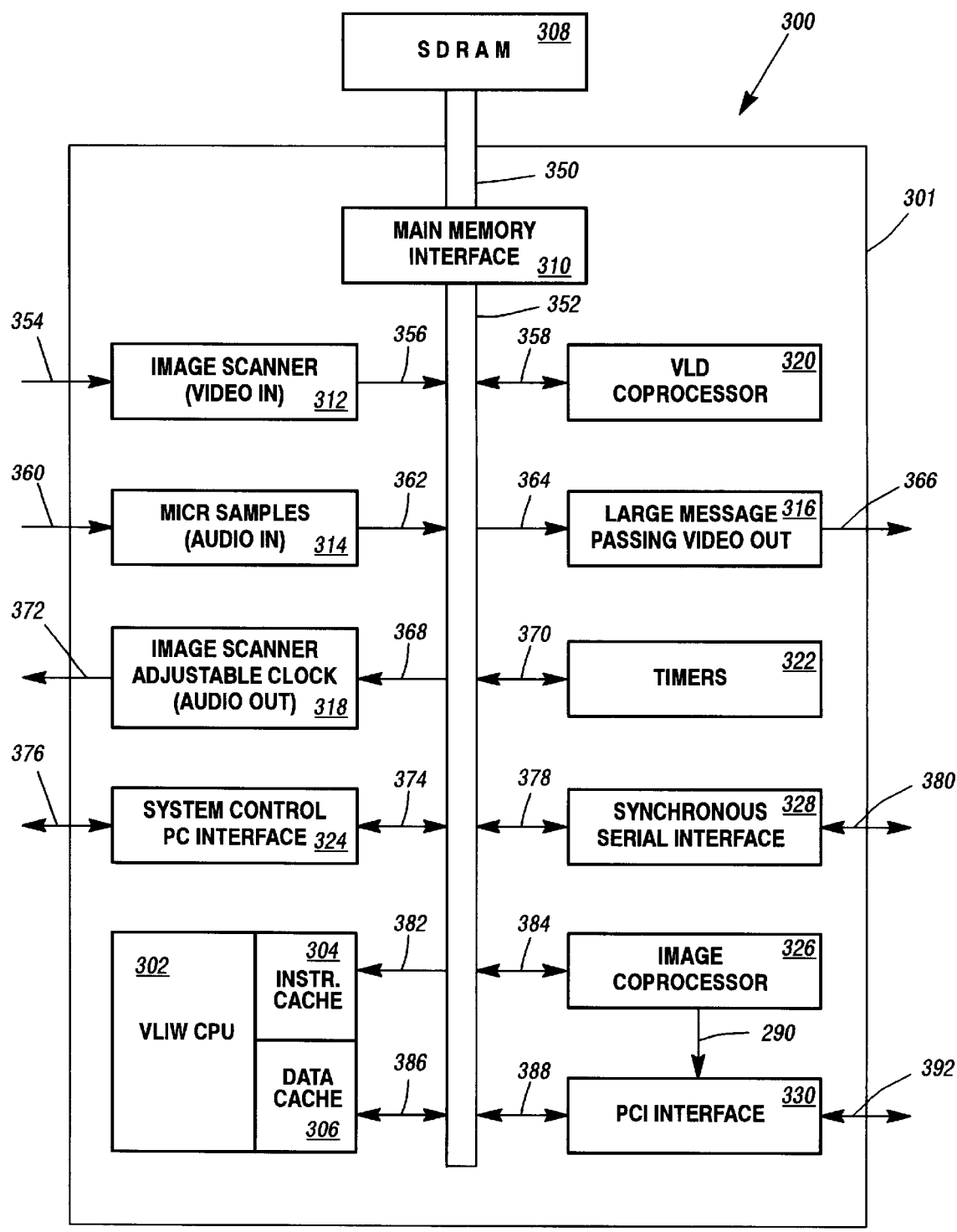
FIG. 3 sets forth a block diagram of a scanner processor and memory used in conjunction with the method of the invention.

The method of the invention takes advantage of features of a new processor chip incorporated into the Unisys SourceNDP product. Processor system 300 of FIG. 3 is discussed in detail in copending U.S. patent application Ser. No. 09/357,003, filed Jul. 19, 1999, and hereby incorporated by reference.

With reference to FIG. 3, processor 302 compresses image data received by image scanner data stream processor 312 (which buffers the raw image data and transfers it to memory 308 which is a SDRAM). Processor 302 after compressing the image data and restoring it in memory 308 then causes the data to be transferred via output image data stream processor 316 which, in turn, transmits the compressed image data to an external utilization device (not shown) via bus 366.

Image coprocessor 326 is used in conjunction with the main processor 302 to process image data—specifically, to create a background average for CCITT compression. A ⅟₁₆th scale version of the original image is the created background. This creation of a background can advantageously be accomplished in parallel with other processing steps being undertaken by CPU 302.

The new method of the invention for CCITT compression is faster than previous CCITT compression processes for several reasons. First, the method combines the thresholding step with the transposition step previously required for those scanning devices storing the pixel data in the reverse order of that used in the typical raster scan. Secondly, the method takes advantage of the caching architecture of CPU 302 of FIG. 3 and the CPU's requirement to read memory as blocks of sixteen words. Additional speed is obtained by using the hardware coprocessor 326 to create a background average for the thresholding step.

As mentioned previously, coprocessor 326 of FIG. 3 is used to create a background of the image data. The background will basically comprise a 1/16th scale size replica of the original image. This replica is created by applying a five tap image filter in both the horizontal and vertical directions about an individual pixel of interest. Use of five pixels at time to determine an average value results in a smoother general average as opposed to simply taking all sixteen pixel values in a 4×4 array and adding their gray scale values and then dividing by sixteen. The background average grayscale value resulting from this step is stored in SDRAM 308 of FIG. 3 along with the original image grayscale value pixels. As discussed below, the background replica will be used in the thresholding step to determine whether each individual grayscale pixel is to be converted to a black or white color.

Figure 4:
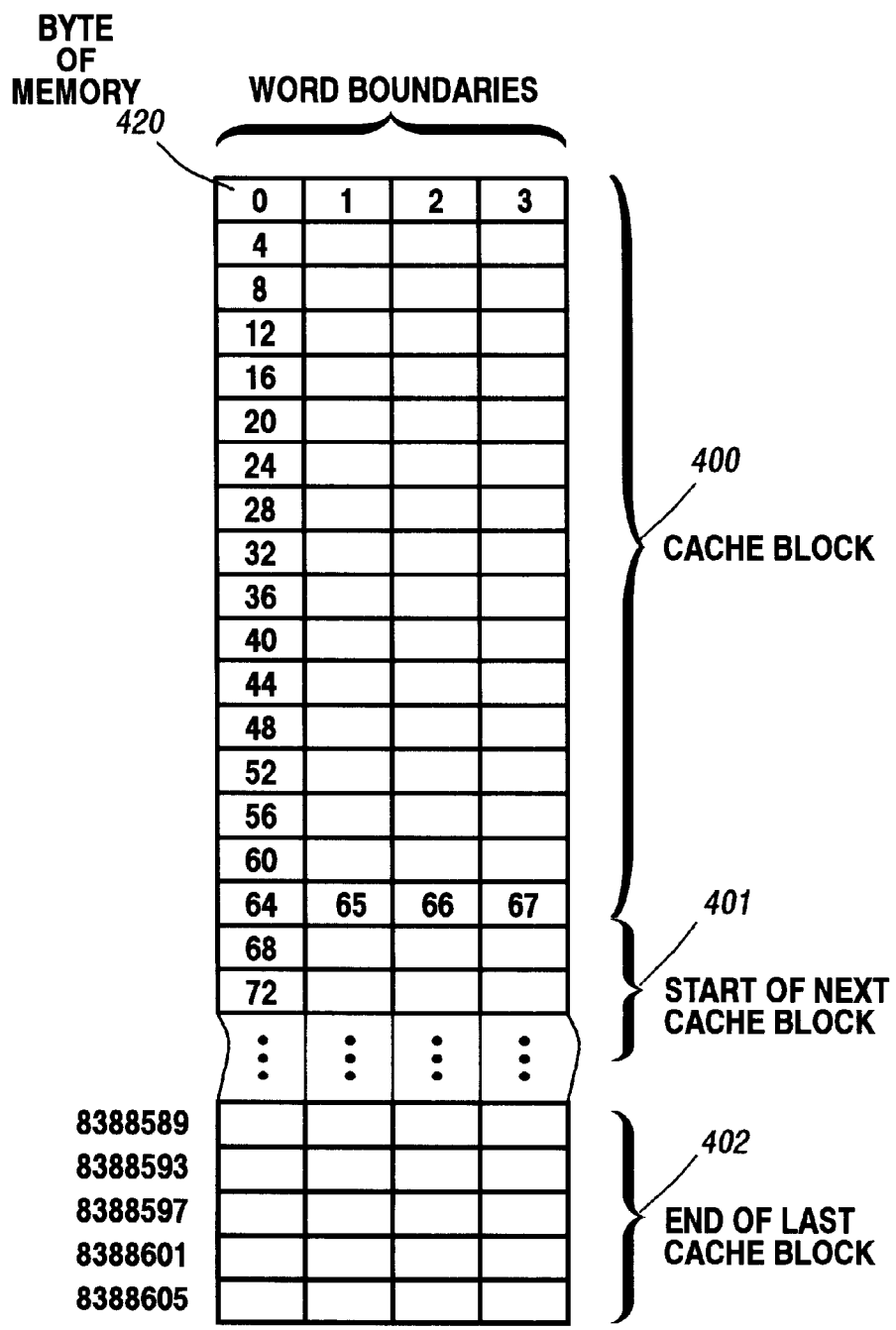
FIG. 4 is a memory diagram showing how data read from memory 308 of FIG. 3 is organized into caches in data cache 306 of FIG. 3.

In the thresholding step for converting the image pixels to black or white, advantage is taken of the manner in which CPU 302 of FIG. 3 caches data and the manner in which memory 308 is read in the processing chip 300 to transpose the image. Whenever a read is performed from SDRAM 308, 64 bytes (16 words) are read simultaneously. FIG. 4 depicts the word and byte organization in the data cache 306 of CPU 302. As seen from FIG. 4, each read of SDRAM 308 results in 64 contiguous 4-byte words being loaded into a cache block 400 of data cache 306.

The data in cache block 400 will remain therein until new data is required which does not fit within the cache. At that point, the cache will start to replace the oldest data.

An optimum compression process, especially from a speed standpoint, must minimize the number of times the data in the cache is exchanged. This is accomplished in accordance with the invention by a program which uses as many bytes in a 64 byte block as possible at one time to keep slower memory fetches from SDRAM 308 to minimum.

Figure 1:
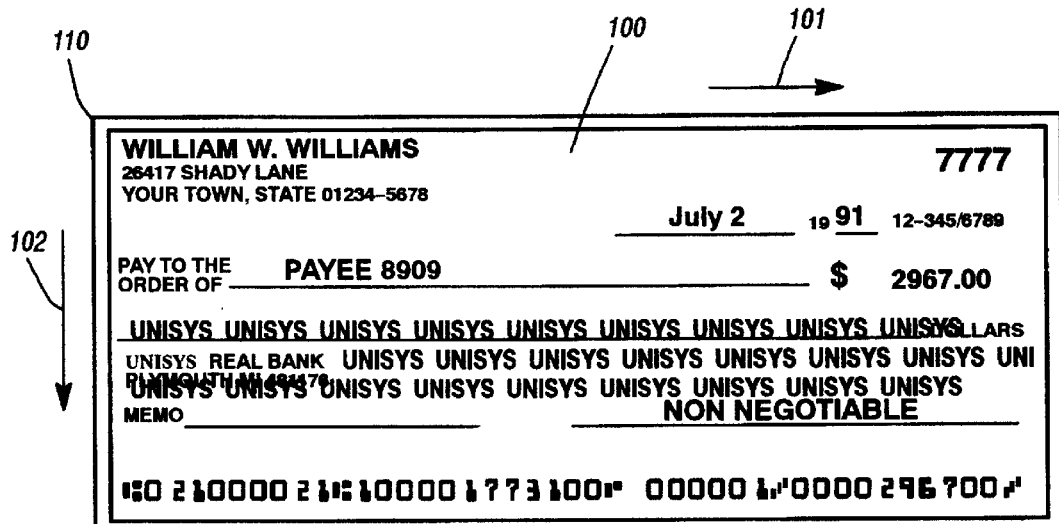
FIG. 1 depicts a document, such as a bank draft, showing how image pixels of the scanned document are stored in raster format.
Figure 2:
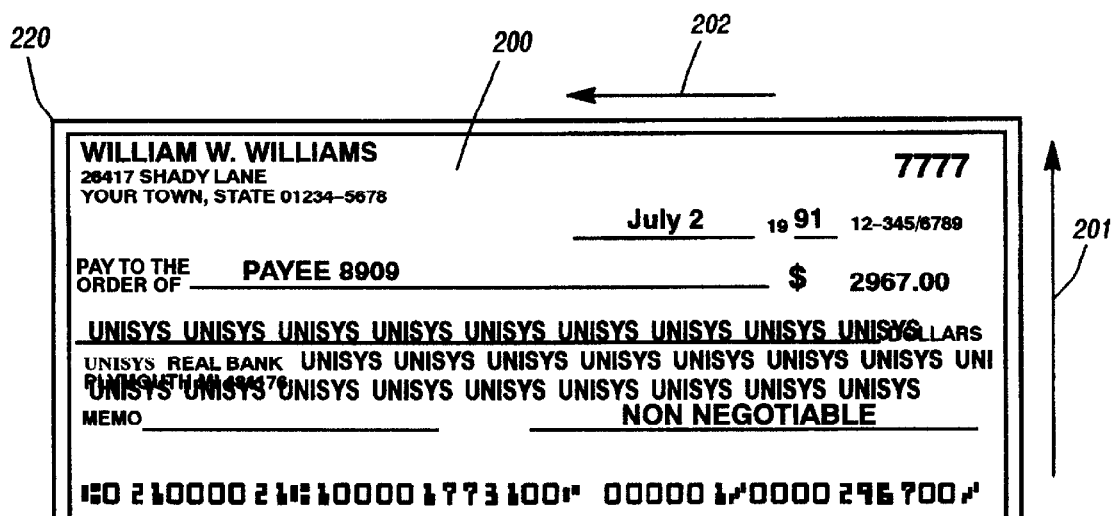
FIG. 2 depicts the bank draft of FIG. 1, but with the order of image pixel storage in scanner format.

As previously mentioned in conjunction with FIGS. 1 and 2, the order of the data received from the scanner via bus 354 in FIG. 3 is from the document's bottom to top, and right to left along each row. Hence, the image processing must proceed in a manner which will automatically transpose the resultant thresholded pixels into a raster type format of FIG. 2.

Figure 5:
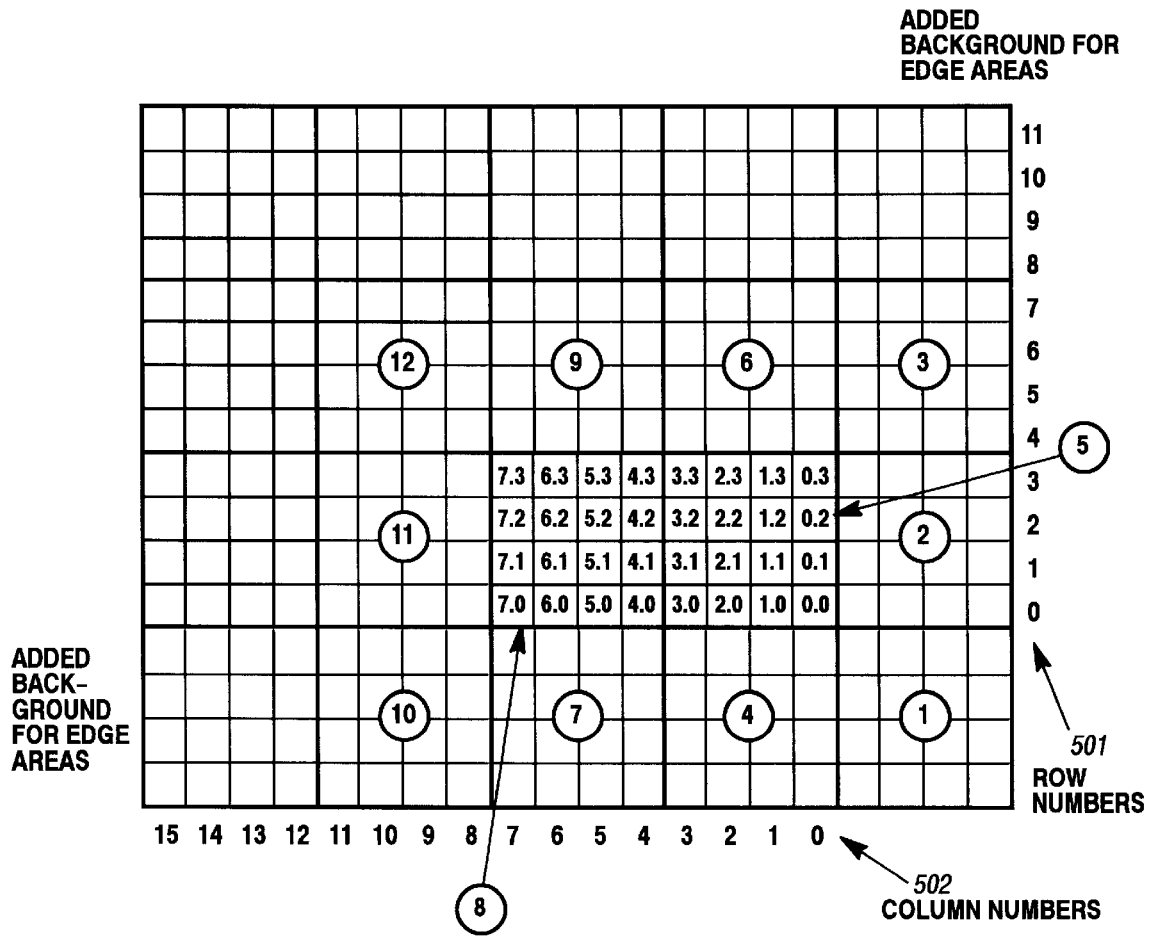
FIG. 5 sets forth an example of pixel grouping in creating a background image.

The transposition step utilizes a left-to-right threshold processing step. With reference to FIG. 5, the transposition process for each row starts at the left most pixel of a block of interest, e.g. at column 7 of FIG. 5 and working to the right towards column 0. Once a pixel is thresholded, however, it is stored in a byte position corresponding to a transposed position of the image.

In the past, the method of creating a thresholded pixel would take a window of the original image (e.g. a 13 pixel by 13 pixel window around the pixel being thresholded) to determine the average grayscale value in the window. This window average background value would then be used to look up a value from a thresholding curve to determine whether a pixel should be converted to black or white. A family of such typically used curves is set forth in FIG. 6.

In accordance with the invention, a 12×12 pixel window surrounding the pixel of interest is used. This window will not always be perfectly centered relative to the particular pixel being thresholded. The window will be constructed from the 1/16th scale replica described above. The 12×12 pixel window will therefore be the average of nine background values. These nine background values will be that containing the pixel of interest and the eight 4×4 pixel array average values surrounding the array containing the pixel being processed. By using the background average in this way, sixteen pixels can be processed before recalculating the background average. In addition, the method will process two sets of backgrounds simultaneously. The advantage in processing two backgrounds simultaneously is the ability to combine eight thresholded pixels into one transposed output byte containing eight single bit thresholded pixels. The eight columns being processed simultaneously produce a bit which is either set or reset. The eight values together produce one byte to represent the thresholded value of eight original pixels of the image. By placing each of the bits in the correct order, the image has been thresholded and simultaneously transposed. By placing the eight pixels into one byte, the data to be written to memory has been reduced by a factor of eight. This likewise reduces the complexity of the remaining processing steps.

With reference to FIG. 5, the steps for performing thresholding are, as follows. First, eight contiguous columns are selected for thresholding—e.g. columns 0 to 7. Next, the background average for the twelve blocks surrounding the pixel of interest are read. For example, for the first four pixels in block five, the background average values for surrounding blocks 1, 2, 3, 4, 6, 7, 8 and 9, along with block 5 itself, are used calculate the background average. Simultaneously, for the second set of pixels in block eight, one would use the background average values for blocks 4, 5, 6, 7, 8, 9, 10, 11 and 12 to obtain the background average.

Figure 6:
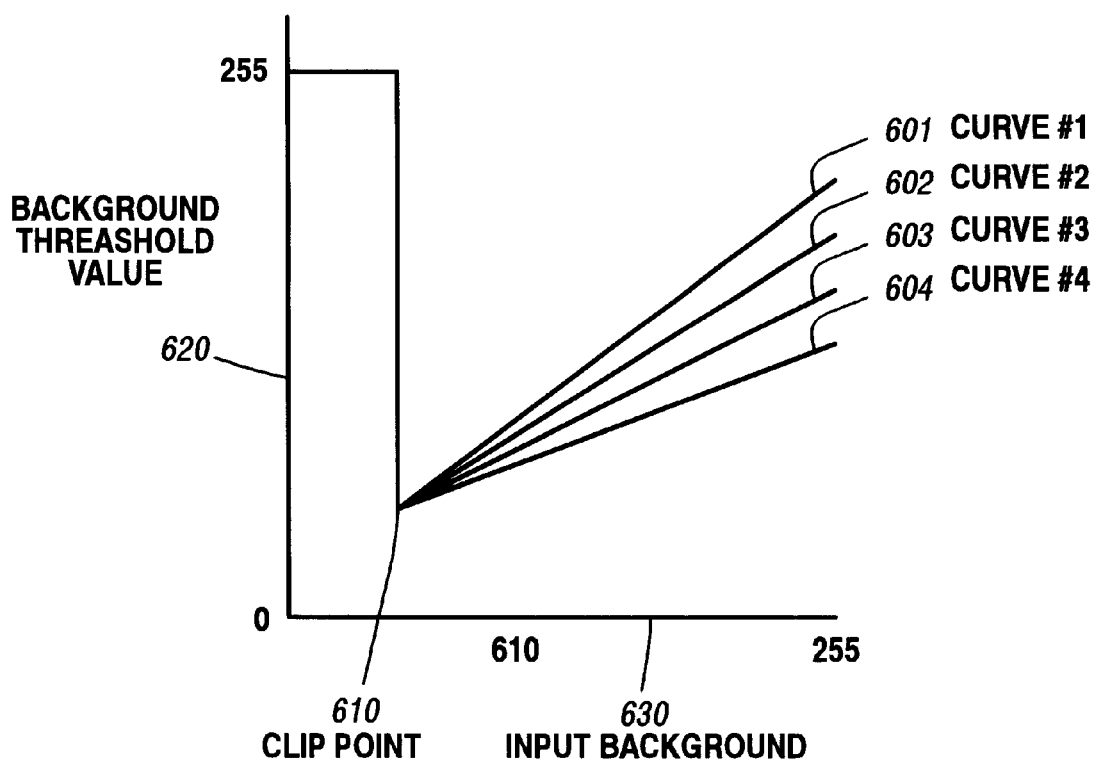
FIG. 6 is a graph showing various threshold functions useable in thresholding the pixels of FIG. 5.

Using the averages calculated as described above, a threshold value is determined by preselecting one of curves 601, 602, 603 or 604, of FIG. 6. Whenever the input background is below a specified clip point 610, the background threshold is set to a maximum. For all other values the threshold is some percentage of the input background as determined by a specific thresholding curve. A pixel will be set white whenever its value is above the background threshold level. Otherwise the pixel will be black.

Figure 7:
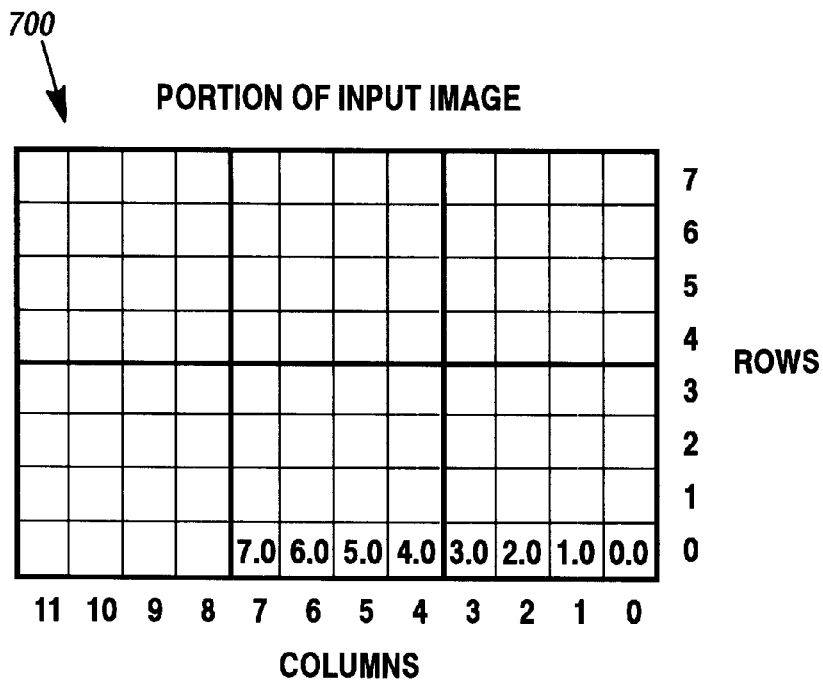
FIG. 7 is an example of how individual pixels are thresholded.

With reference to FIG. 7, an example is set forth for eight contiguous pixels being thresholded. For each pixel in row zero shown, with the example grayscale values set forth in the second column, these values are then each compared with a background threshold determined by the input background average and the thresholding curve of FIG. 6 to come up with a background threshold gray level in the next to last column. If the grayscale value of the original pixel of interest is less than or equal to the background threshold, then the pixel is set to black, or zero. Conversely, if the grayscale value of interest is greater than the threshold level, then that pixel is set to white, or binary one. The resultant output byte is stored as the transposed thresholded byte containing eight thresholded pixels corresponding to eight original grayscale value pixels of the raw image data.

Next, a compressed buffer pointer is advanced by the width of the image and the next row is processed as above. This continues until all pixels in the document's image field have been thresholded.

The next step in the process is to reduce the amount of data handling required even further. The method implementing CCITT Group 4 compression examines the locations of pixel transitions from black to white or vice versa. Since the memory available to do compression is limited and the worst case image would have alternating black and white thresholded pixels, a method of storing the transition locations as a series of pointers has been created which uses the space holding the original image data in memory 308 of FIG. 3. This worst case scenario requires one byte for each transition marker. Since the original image was stored as eight bit bytes, a number representing the number of pixels encountered until the next color change is stored. Since a byte can have values between 0 and 255, the method requires a way for storing and indicating pixel runs of the same color exceeding a length of 255. A transition from black to white must be at least one pixel, so a value of zero is used to indicate 256 pixels and the next location will store the additional pixels required to finish the pixel run of the same color. This allows any run length to be represented by multiple zeros and the corresponding left over value in the last byte. For example, a series of pointers containing the values 0, 0, and 5 would indicate a pixel run of 517 pixels (256+256+5).

When processing horizontal scan lines, an imaginary white pixel is assumed to be to the left of the first real pixel in the image. Transition points are determined quickly by accessing an appropriate black or white transition look-up table (LUT). These tables will identify the next transition to a black or white pixel value.

When seeking a transition to black, the black LUT is accessed using the value of the byte of thresholded pixels as an address. Conversely, when looking for a transition to white, a white LUT is accessed. With reference to FIG. 8, if a byte of eight thresholded pixels has a value of hexadecimal 31$h$, then one would access the LUT 800 at address hex 31$h$. For the white look-up table, the address of 31$h$ would yield an output of 3. This represents the first time a value of 1 was found at a pixel position moving from left to right. Similarly, for the black look-up table, the address of 31$h$ would yield an output of 1, representing the first time a value of zero was found at a pixel position moving from left to right. Each result garnered from an access of a lookup table is stored as a single byte transition pointer in SDRAM 308 of FIG. 3 in the fields which originally held the raw image data.

If the result read from a look-up table is zero, this indicates there were no transitions in the eight bits of that particular byte, and the length of the run of a similar color grows larger. When a transition is found, the thresholded byte is rewritten by changing all pixels to the left of the transition location to the opposite color. For example, if one is looking for a transition from black to white, where white equals 1 and black equals 0, the byte 00110001 would be rewritten as 1110001. The white transition was found at bit position 5, therefore the black bytes in position 6 and 7 are made white before proceeding. This allows the black look-up table to properly access the next transition and skip transitions it has already processed. A special case occurs if a run is an exact multiple of 256. In this case, the last transition value instead of being 0 is made 255 to correctly maintain black to white transitions. Each byte of thresholded pixels is used is repeatedly access the black and white look-up tables in an alternating fashion until no more color transitions in that byte are found.

The last step in the process is the actual encoding process. This has been made much easier by the reduction of data in the system in comparison to previous methods. Referring to the example of FIG. 9, the entire encoding process depends upon knowing the location of up to six pixels in a current row and previous row of thresholded pixels. The current row 902 has up to three, and the previous row 901 has three. These pixel locations are referred to as the A0, A1, A2, B0, B1 and B2 locations.

The A0 location is the left-most unprocessed pixel in the current line 902. The next color transition in the line will be the A1 location, and the next transition after that will be the A2 location.

The A2 location is not always needed depending upon the B2 location. The B0 location is always defined as the pixel directly above A0. B1 is the first transition pixel above A0 which is the same color as A1 and to right of B0. B2 is the next color transition to the right of B1. Since the method depends on the transition of colors, the manner in which the data is stored makes determining the locations of the transitions quite simple.

The process requires the first line in the image to be an imaginary all white line and to start each line with an imaginary white pixel immediately to the left of the first real pixel. The method then hunts for the A1 location. This will be the first black pixel to the right of A0. The B1 location is then found by locating the next pixel transition to the right of B0. This pixel transition must also be the correct color match as defined above. The B2 location is then just the next color transition location to the right of B1. The A2 location, if needed, will simply be the next transition to the right of A1.

Once all the A and B locations are located, the coding of the bit stream can commence. However, it is a key element of this invention that such locations are determined much more quickly than in the past. In the past, conventional approaches, each pixel had to be separately examined to determine the location of the color transitions. With the invention implemented as described herein, the locations are found by reading a table of transition pointers which were generated as described above with respect to the black and white look-up tables. Hence, in most cases, the transition locations are quickly determined with a single access of the pointer table.

There are three different types of bit stream coding methods used pursuant to the CCITT Group 4 specification. These known methods are pass mode, vertical mode, and horizontal mode. The pass mode coding is done whenever the location of the B2 pixel is to the left of the A1 pixel. Vertical mode coding is done whenever pass mode coding is not used and the distance from the A1 location to the B1 location is less than four pixels in either direction. Finally, horizontal mode coding is implemented in all other circumstances.

Pass mode coding simply generates a predefined code to the compressed bit stream. The A0 location is then moved to just below the B2 location (see step 920 of the example of FIG. 9). In this case, the color of the A0 pixels stays the same, but it is no longer directly at a pixel transition as stored in memory. In this case, the location of A0 is assumed to be at the previous A0 location, but a correction factor equal to the distance between the previous B2 and A0 locations will be applied when looking for the next A1 (for example, between steps 910 and 920 of FIG. 9.)

For vertical mode coding, one of seven special codes is placed onto the compressed bit stream. Which of the seven codes depends upon the seven possible locations of B1 relative to A1. The location of A0 will now become the location of A1 and the color of A0 will be switched.

For horizontal mode coding (see, for example, step 930 of FIG. 9) the A2 value is needed when processing the image bit stream. The A2 location is simply the next transition after A1. The compressed bit stream in this case will receive codes containing the lengths of the two pixel runs, running from A0 to A1 and from A1 to A2. It does not matter if the first run was black or white. The next value of A0 will be moved to the A2 location.

Before continuing with the compression of a row of pixels, after each coding step, the location of B0 is used to generate a B1 correction value. This value is the distance between the new A0 location and the first transition to the left of that A0 location. The process then transitions back to looking for the next set of the six A and B locations in the two rows of interest until the end of the row is reached.

The examples set forth in FIG. 9 demonstrates a current row bit pattern 902 and a previous row bit pattern 901 which results in all three types of CCITT Group 4 encoding steps.

Assume the coding process starts at the left-most pixel of rows 901 and 902 at step 910. As seen from FIG. 9, the six A and B values or locations are determined by merely reading the table of transition pointers. These pointers must be corrected as one proceeds along encoding of the row to reflect that which has already been processed. For example, after pass mode coding is determined to be required at step 910, before proceeding to the next six sets of A and B values at step 920, the A1 location is corrected by a value of 4 for this example, which is the distance between B2 and A0 at step 910.

At step 920, by locating the six A and B pixels of interest, using the table of pointers, it is quickly determined that vertical mode coding is to be implemented because the distance between A1 and B1 is 0, or less than 4. After the encoding step, no nonzero correction values are required.

At step 930, a location and examination of the relative positions of the six A and B values determines that horizontal mode coding is required. As a result of this coding step at 930, a B1 correction value of 6, which is the distance between A2 and A0 is determined to be necessary prior to the next encoding step at 940.

A program for specifically determining the correction values for the A and B values discussed above is set forth in the flow chart of FIGS. 10A, 10B and 10C.

Figure 10A:
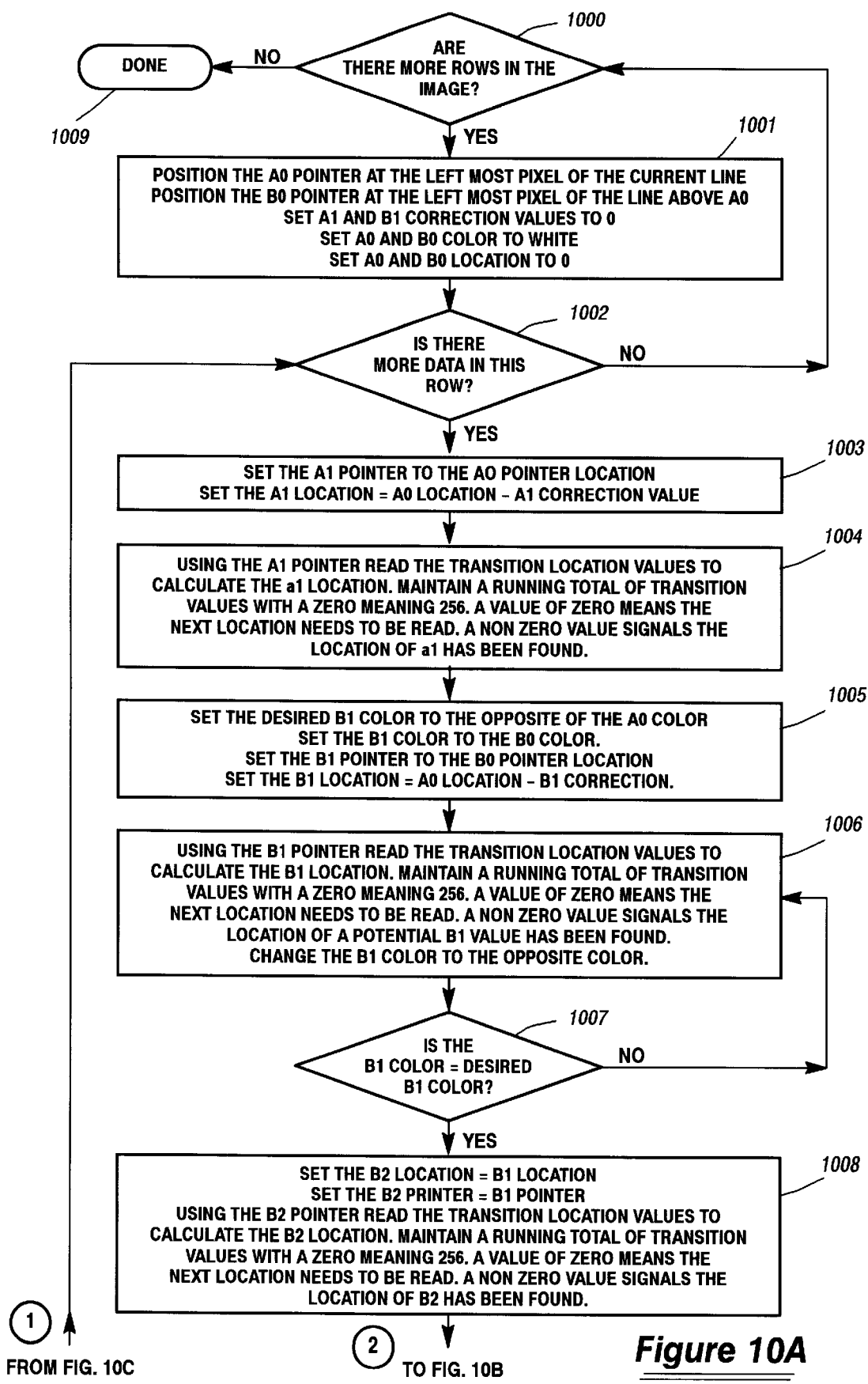
FIGS. 10A, B and C set forth a flow chart demonstrating a method for using a table of color transition values in lieu of examining each individual pixel for determining run lengths for CCITT Group 4 coding.
Figure 10B:
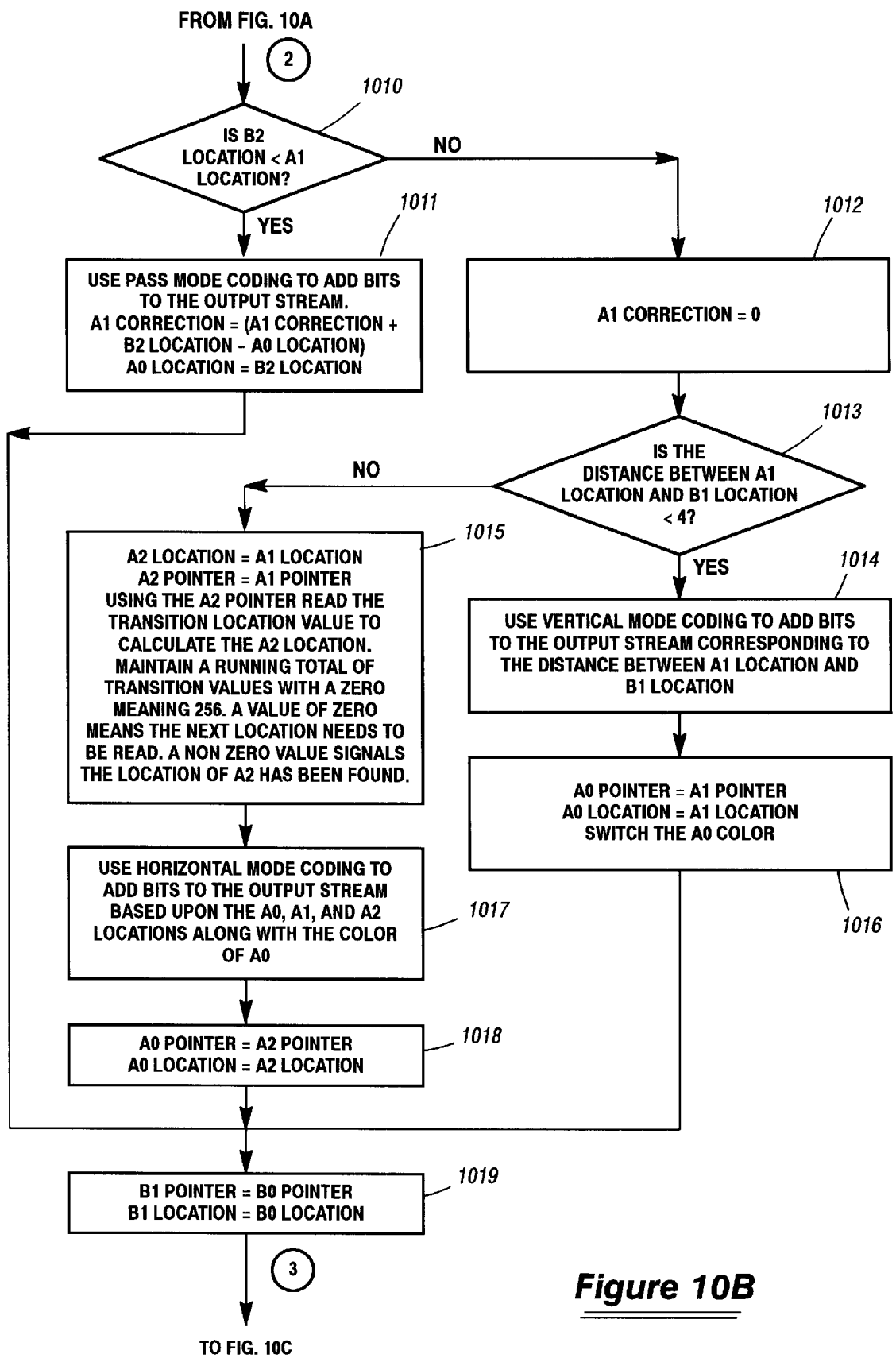
Figure 10C:
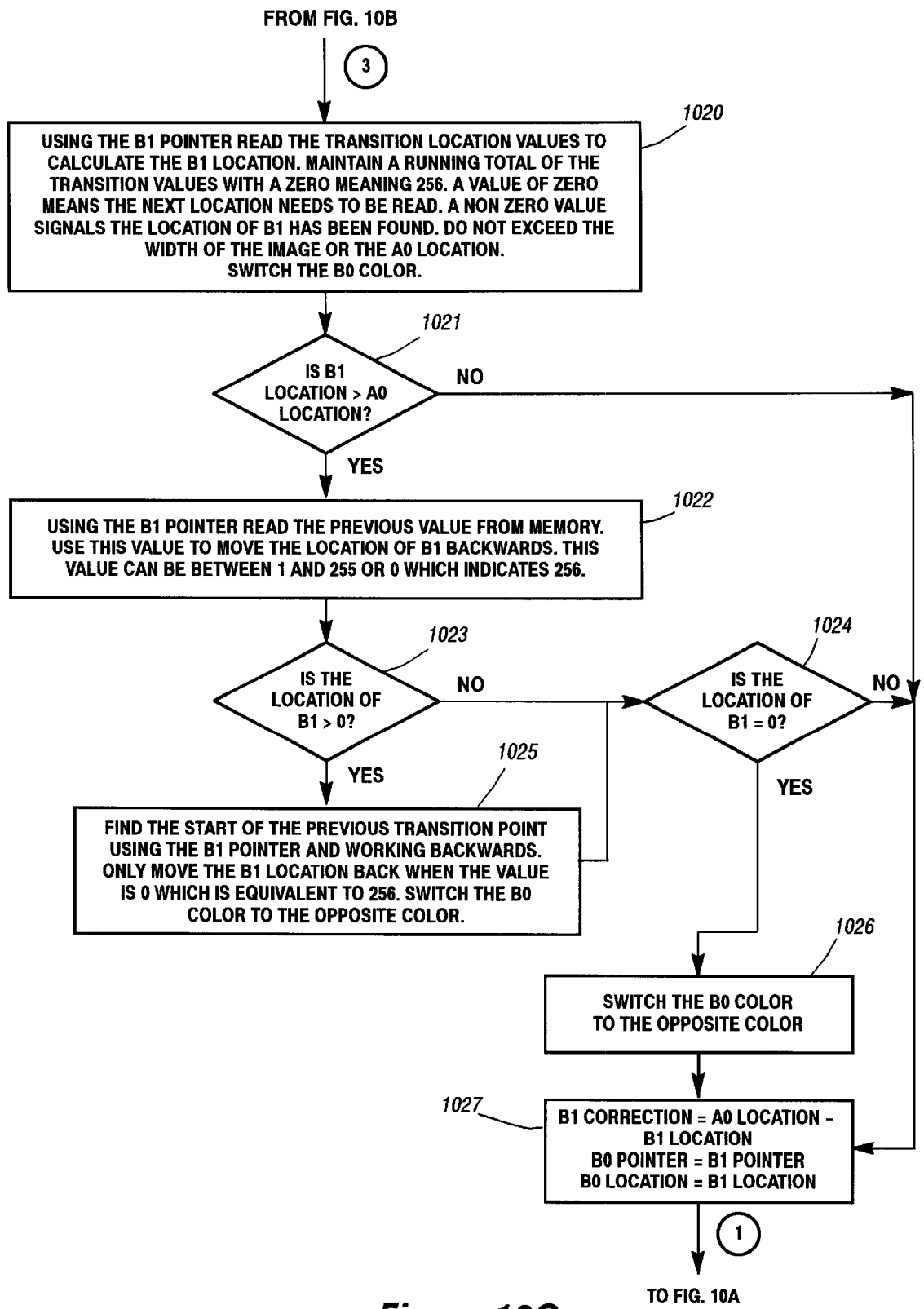

Proceeding through the flow chart of FIGS. 10A–C, one will gain an understanding of how the program in a mathematical sense will maintain proper pointer correction values.

With reference to FIG. 10A, the routine starts at decision block 1000 to test for more rows of pixels left unprocessed in the image. If there are no more rows, then the task is complete and the routine exits at 1009.

If it is determined that more rows of pixels are to be compressed, the routine at block 1001 positions the A0 pointer at the left-most pixel of the current row and positions the B0 pointer at the left most pixel of the previous row, or the row above that containing A0. The A1 and B1 correction values are initialized to 0, the A0 and B0 colors are set to white (binary one) and the A0 and B0 locations are set to 0, or the starting pixel in the current row.

Next, at decision block 1002 it is determined whether there is more pixel data to be processed in the current row. If not, then the routine returns to decision step 1000. If there are more data in the row to be processed, the routine proceeds to block 1003 where the A1 pointer is set to the A0 pointer location and the A1 location is set equal to the A0 location minus the current correction value for A1.

At block 1004, the routine uses the A1 pointer to read the transition location values from the pointer table to calculate the A1 location. A running total is maintained with a 0 indicating a run of 256 pixels of a like color. At step 1005, after the A1 location has been determined, the desired B1 color is set to the opposite color of the current A0 pixel. The B1 color is set equal to the B0 color, the B1 pointer is set to the B0 pointer location and the B1 location is set equal to the A0 location minus the B1 correction value, if any.

At step 1006 the routine uses the B1 pointer to read the transition location table to calculate the B1 location. At decision block 1007, once the B1 location is determined, the BR color is examined to see whether it is equal to the desired B1 color. If not, the routine returns to step 1006 to recalculate a B1 location. If the B1 color is the desired match, then the routine proceeds to step 1008 where the B2 location is set equal to the B1 location, the B2 pointer is set equal to the B1 pointer and the B2 pointer is then used in conjunction with the transition pointer table to calculate a new B2 location.

Next, the routine proceeds to decision block 1010 of FIG. 10B where the B2 location is compared to the A1 location. If the B2 location is less than the A1 location, then pass mode coding is called for at step 1011. If the B2 location is greater than or equal to the A1 location, then the routine proceeds to step 1012, where the A1 correction value is set to 0.

At decision block 1013, the distance between the A1 pixel location and the B1 pixel location is tested to determine the absolute value of the distance. If this distance is less than 4, then vertical mode coding is implemented at step 1014. If the distance is greater than or equal to 4, then the routine proceeds to step 1015 which uses the A2 pointer to read the transition location table to calculate the A2 location. Since the test at block 1013 indicated a distance greater than or equal to 4, then horizontal mode coding is therefore implemented at block 1017. At block 1018, the A0 pointer is set equal to the A2 pointer and the A0 location is set equal to the A2 location in preparation for the next coding step. At block 1016, after vertical mode coding has been completed, the A0 pointer is set equal to the A1 pointer, the A0 location is set equal to A1 location and the A0 color is switched in preparation for the next encoding step. At block 1019, the B1 pointer is set equal to B0 pointer and the B1 location is set equal to B0 location. The routine then proceeds to block 1020 of FIG. 10C, where the B1 pointer is used to read the transition location table to calculate a new B1 location. At decision block 1021, the B1 location is tested in terms of the A0 location. If the B1 location is greater than the A0 location, then the routine proceeds to block 1022 where the B1 pointer is used to read the previous value from memory to move the location of B1 backwards until the proper transition point is reached. If the B1 location is not greater than the A0 location, then the routine proceeds to block 1027.

From block 1022, the routine proceeds to decision block 1023 where the location of B1 is tested for a positive or negative value. If the B1 location is greater than 0, the routine proceeds to block 1025 where the start of the previous transition point using the B1 pointer is located by working backwards. If the location of B1 is not greater than 0, then the routine proceeds to the decision block 1024. If the location of B1 is now 0, the routine proceeds to block 1026, otherwise the routine skips to block 1027.

At block 1026, the B0 color is switched to the opposite color, and at block 1027, the B1 correction value is set equal to the distance between the A0 and B1 locations, the B0 pointer is set to the B1 pointer and B0 location is set equal to the B1 location. At this point the routine returns to FIG. 10A at decision block 1002, and the processing of the pixel data in each row continues.

Figure 11:
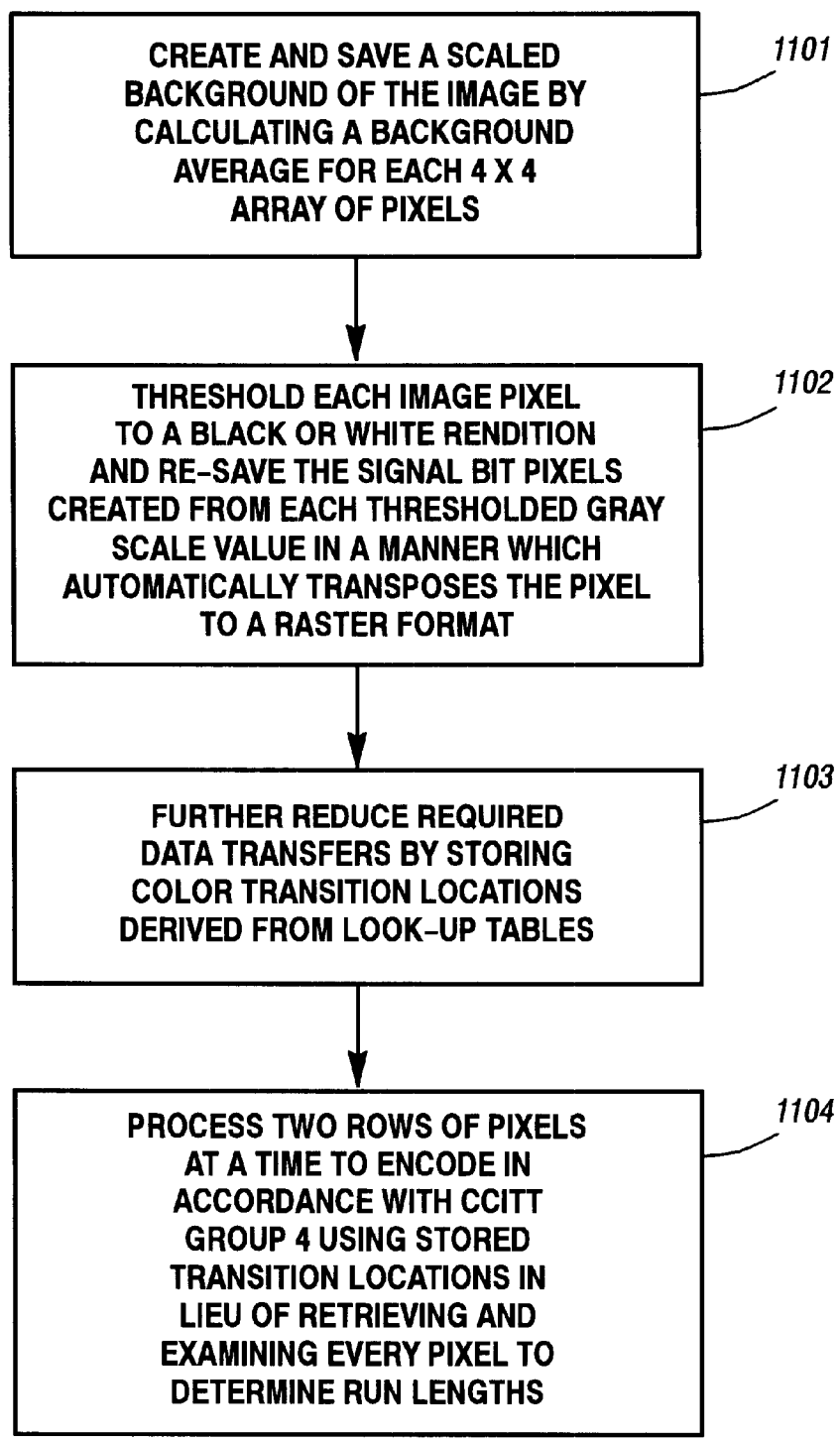
FIG. 11 sets forth a flow chart of the overall method of the invention.

The overall method of this invention may be summarized in conjunction with the flow chart of FIG. 11. At step 1101, the routine creates and saves a scaled background of the image by calculating a background average for each 4×4 array of pixels.

At step 1102 each image pixel is thresholded to a black or white rendition and re-stored as a single bit in a manner which automatically transposes the pixels to a raster format.

At step 1103 data access time and frequency are further reduced by storing color transition locations derived from black and white look-up tables.

Finally, at step 1104, in accordance with CCITT Group 4 encoding principles, two rows of pixels are processed at a time to encode run lengths which are determined by accessing the table of pointers previously generated in lieu of retrieving and examining every pixel to determine run lengths to be encoded.

The invention has been described with reference to a preferred embodiment for the sake of example only. The scope and spirit of the invention are to be defined by a proper interpretation of the appended claims.

I claim:

1. A method for CCITT compression of image data comprising the steps of:
    a) creating and saving a scaled background of the image by calculating a background average for each array of pixels of a predetermined size;
    b) thresholding each pixel to a black or white rendition and storing the thresholded pixel in a manner which automatically transposes the pixels to a predetermined order;
    c) determining run lengths of adjacent pixels having like color and storing the run lengths as color transition pointers in a memory table; and
    d) processing two rows of thresholded pixels simultaneously pursuant to CCITT Group 4 encoding principles using the color transition pointers from the memory table in place of retrieving and examining each pixel individually to determine transition locations in the two rows.

2. The method of claim 1 wherein the step of determining run lengths is performed using a white look-up table when searching for a pixel transition from black to white and a black look-up table when searching for a pixel transition from white to black.

3. The method of claim 1 wherein each array of pixels used for calculating a background average has a size of four pixels by four pixels.

4. The method of claim 3 wherein the background is created using a five tap image filter in both the horizontal and vertical directions.

5. The method of claim 1 wherein the step of thresholding utilizes a 12×12 pixel window surrounding a pixel to be thresholded, the 12×12 window comprising an average of nine background values.

6. The method of claim 5 wherein the step of thresholding includes simultaneous processing of two sets of four pixel by four pixel backgrounds.

7. The method of claim 1 wherein the determined run lengths are stored as eight bit bytes, with a byte of all zeros indicating a run of 256 pixels.

8. The method of claim 1 wherein the step of thresholding includes the further steps of:
    determining a background threshold as a predetermined function of an input background for a pixel being thresholded;
    comparing a grayscale level of the pixel being thresholded to the background threshold; and
    setting the pixel being thresholded to a first predetermined color whenever its value is above the background threshold and setting the pixel being thresholded to a second predetermined color whenever its value is equal to or less than the background threshold.

9. In a method for compressing document image data in accordance with CCITT wherein a document to be imaged is scanned in a first format and the resultant image data is compression processed in a second format, wherein image data pixels are transposed into the second format, wherein each image data pixel is next thresholded to a black or white value, and wherein the transposed and thresholded image pixels are examined to determine run lengths of a same color, the improvement comprising:
    combining the steps of transposing and thresholding into a single step.

10. In a method for compressing document image data in accordance with CCITT Group 4 wherein preselected run lengths of a same pixel color in two adjacent rows of image data are examined for each encoding step, the improvement comprising:
    alternately using a first color look-up table and a second color look-up table to determine locations in each pixel row of respective transitions between the first and second colors; and
    using the determined transition locations in lieu of examining each pixel of the two adjacent rows to perform the CCITT Group 4 encoding process.

* * * * *